(12) United States Patent
Zhang et al.

(10) Patent No.: US 7,587,836 B2
(45) Date of Patent: Sep. 15, 2009

(54) DETECTING APPARATUS

(75) Inventors: Bing-Jun Zhang, Shenzhen (CN); Lian-Zhong Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 142 days.

(21) Appl. No.: 11/869,751

(22) Filed: Oct. 10, 2007

(65) Prior Publication Data

US 2008/0141547 A1 Jun. 19, 2008

(30) Foreign Application Priority Data

Dec. 14, 2006 (CN) .................. 2006 1 0201297

(51) Int. Cl.
  *G01B 7/30* (2006.01)
  *G01B 5/24* (2006.01)
(52) U.S. Cl. .................. 33/534; 33/549; 33/555
(58) Field of Classification Search .................. 33/534, 33/549, 551, 552, 555, 568, 573, 1 N, 1 BB
See application file for complete search history.

(56) References Cited

U.S. PATENT DOCUMENTS

| | | | |
|---|---|---|---|
| 2,977,533 A * | 3/1961 | Savage ................. | 33/551 |
| 3,098,305 A * | 7/1963 | Anderson ............... | 33/534 |
| 3,101,552 A * | 8/1963 | Tandler et al. .......... | 33/555 |
| 3,249,223 A * | 5/1966 | Johnson et al. ......... | 33/549 |
| 3,417,476 A * | 12/1968 | Martens ................ | 33/549 |
| 4,434,559 A * | 3/1984 | Lauer et al. ........... | 33/560 |
| 4,914,827 A * | 4/1990 | Cook .................. | 33/552 |
| 6,363,620 B1 * | 4/2002 | Goodjohn .............. | 33/508 |
| 6,477,783 B1 * | 11/2002 | Harman et al. ......... | 33/534 |
| 2008/0163508 A1* | 7/2008 | Zhang ................. | 33/534 |

\* cited by examiner

*Primary Examiner*—R. Alexander Smith

(57) ABSTRACT

A detecting apparatus for detecting the angle of a bend in an electrically conductive workpiece is provided. The detecting apparatus includes a platform, a holding bracket mounted on the platform, at least one detecting portion slidably mounted to the platform, a processor, and an indicator electrically connected to the processor. The holding bracket is grounded and configured for holding and electrically connecting with the workpiece. The at least one detecting portion includes a short pin and a long pin. During operation, the pins are normally at high potential and go low if they contact the workpiece. The pins are electrically connected to the processor. The processor judges an eligibility of the angle of the workpiece according to the potential pattern of each pins. The indicator outputs a detecting result done by the processor.

16 Claims, 13 Drawing Sheets

_US 7,587,836 B2_

DETECTING APPARATUS

BACKGROUND

1. Field of the Invention

The present invention relates to detecting apparatuses, and particularly to a detecting apparatus for detecting the angle of a bend in an electrically conductive workpiece quickly and accurately.

2. Description of Related Art

An angle of a bend in a workpiece must be within a certain tolerance. For example, an angle in a fastener for a heat sink cannot be too small or too large, otherwise the heat sink will not fit properly when mounted to an electronic component. An angle gauge is used for detecting whether the angles of the workpiece are eligible. The workpiece is put on the gauge. An operator observes whether angles of the workpiece match corresponding angles of the gauge to decide if the workpiece is eligible or not. However, the aforementioned detecting method is inefficient, because the result is very subjective and not accurate enough.

What is desired, therefore, is a detecting apparatus for detecting the angle of a bend in an electrically conductive workpiece quickly and accurately.

SUMMARY

An exemplary detecting apparatus for detecting the angle of a bend in an electrically conductive workpiece is provided. The detecting apparatus includes a platform, a holding bracket mounted on the platform, at least one detecting portion slidably mounted to the platform, a processor, and an indicator electrically connected to the processor. The holding bracket is grounded and configured for holding and electrically connecting with the workpiece. The at least one detecting portion includes a short pin and a long pin. The pins are normally at high potential. Any of the pins can contact the workpiece and turn to low potential when the at least one detecting portion is slid. The pins are electrically connected to the processor. The processor judges an eligibility of the angle of a bend in the workpiece according to the potential pattern of each pins. The indicator output a detecting result done by the processor.

Other advantages and novel features of the present invention will become more apparent from the following detailed description of preferred embodiment when taken in conjunction with the accompanying drawings, in which:

DETAILED DESCRIPTION

Figure 1:
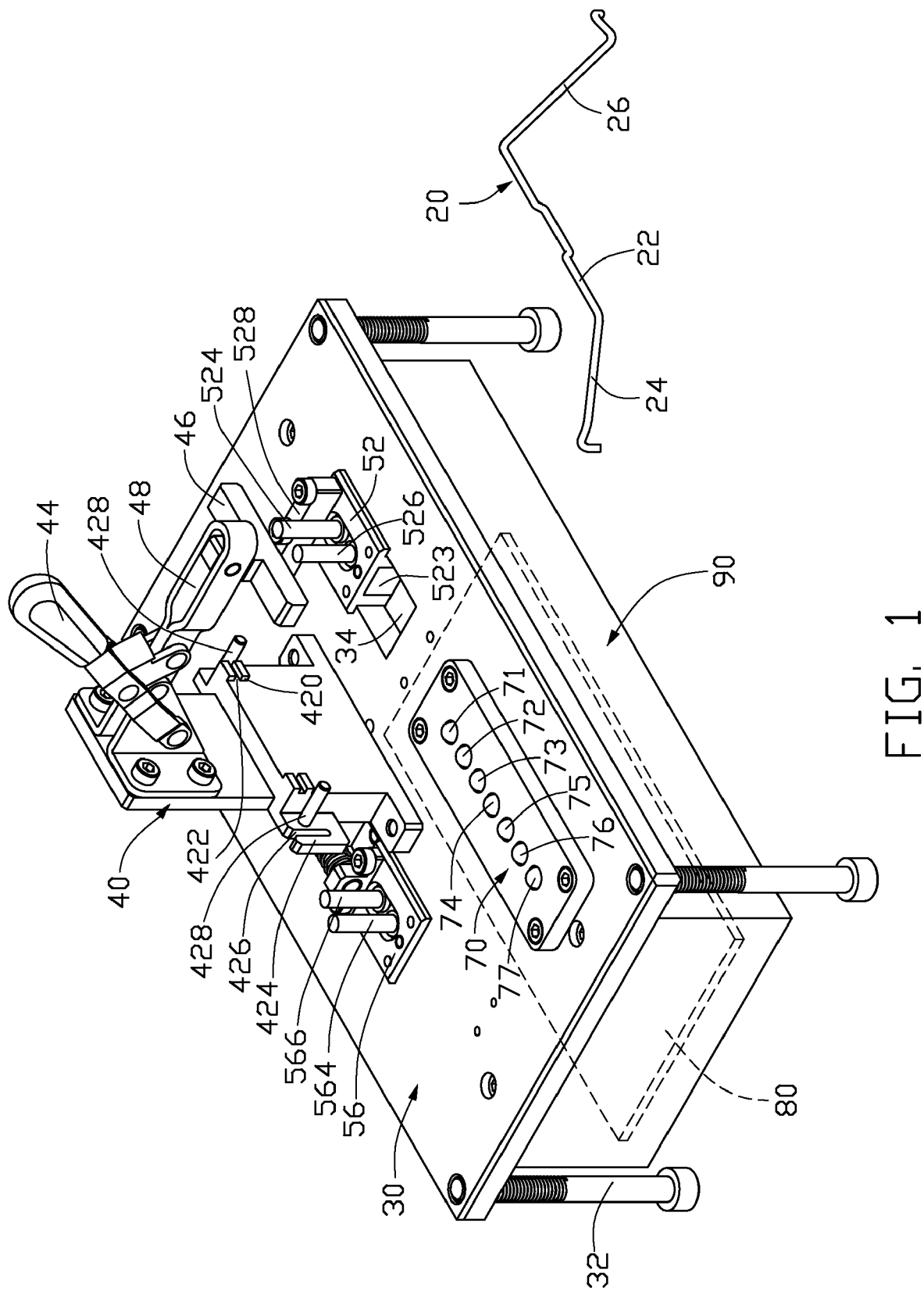
FIG. 1 is an exploded, isometric view of a detecting apparatus in accordance with an embodiment of the present invention with a control box and a workpiece, the control box having a processor set therein.

Referring to FIG. 1, an exemplary detecting apparatus includes a platform 30, a holding bracket 40, a detecting device, an indicator 70, and a control box 90 covering a processor 80. The detecting apparatus is used for detecting whether the angle of bend in an electrically conductive workpiece 20 is eligible.

Figure 2:
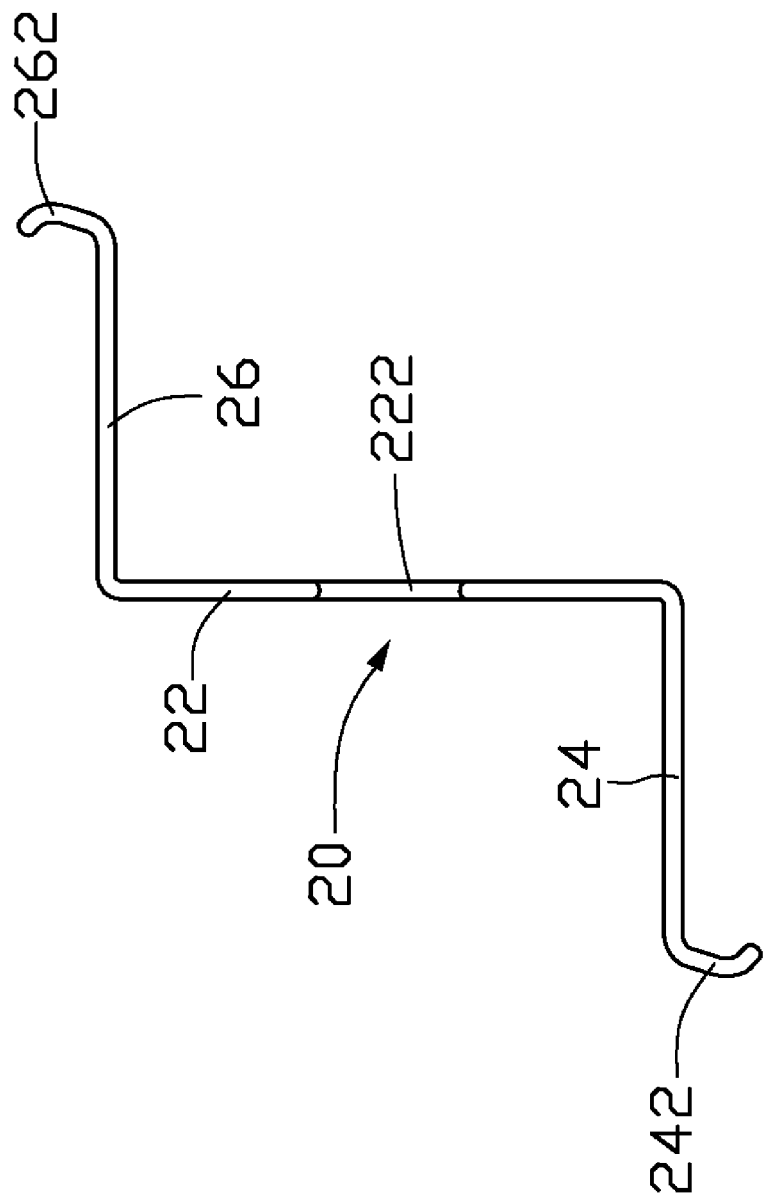
FIG. 2 is a front elevational view of the workpiece.
Figure 3:
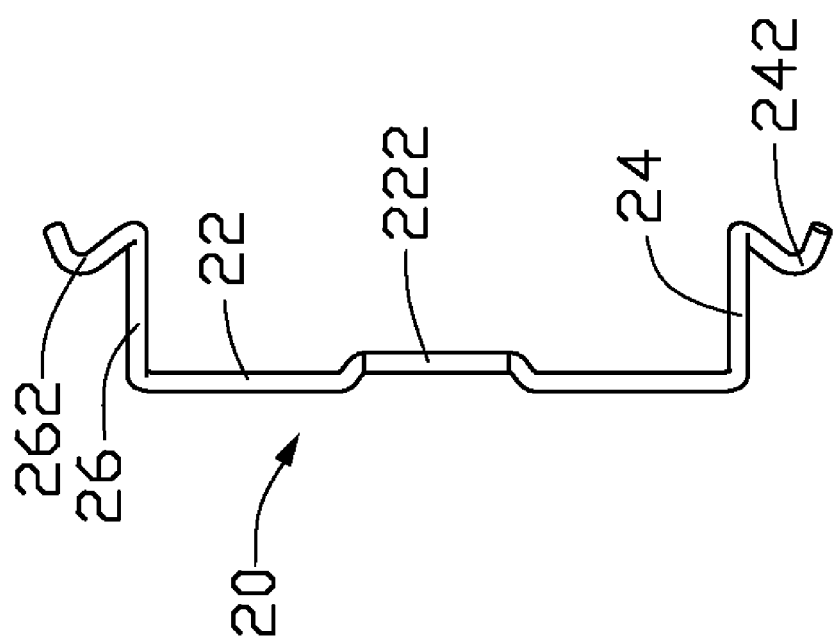
FIG. 3 is a left side elevational view of the workpiece.
Figure 4:
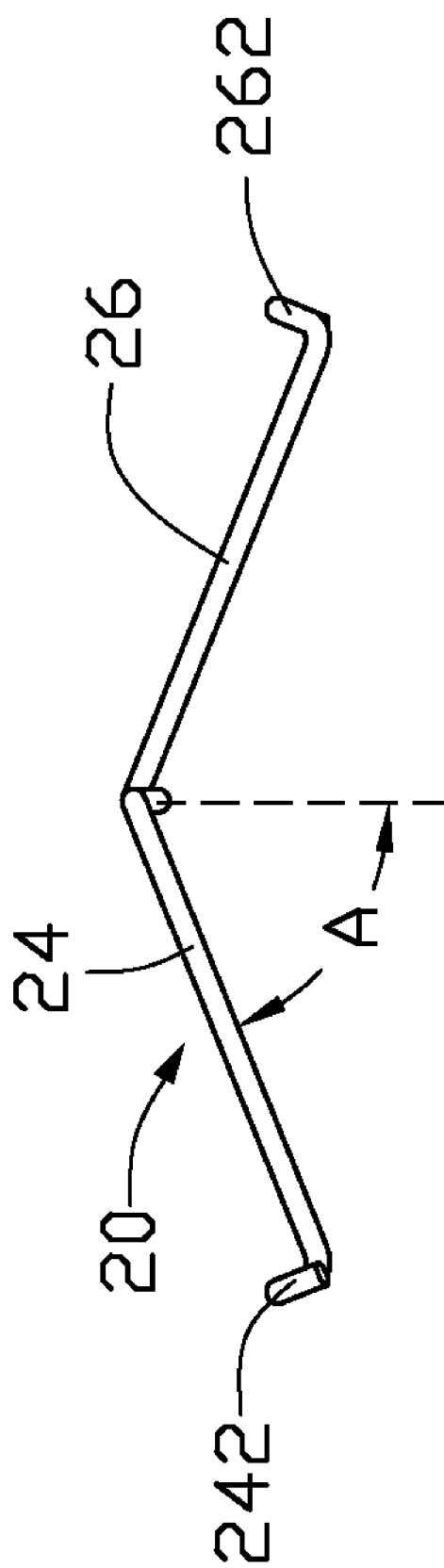
FIG. 4 is a bottom plan view of the workpiece.

Referring to FIGS. 2 to 4, the workpiece 20 includes a shaft 22, and two arms 24, 26 respectively extending from two ends of the shaft 22. The shaft 22 includes an offset section 222 at the middle thereof offset a distance from two aligned end sections. The offset section 222 and end sections of the shaft 22 are parallel with each other, and cooperatively define a plane. The two arms 24, 26 are perpendicular to the shaft 22 and extend to different sides of the plane. An acute angle A is formed between each arm 24, 26 and the plane. The workpiece 20 is a fastener for a heat sink in the embodiment of the present invention. If the angle A is not in an eligible range, the heat sink will not fit properly when mounted to an electronic component by the workpiece 20. Therefore the angle A is the angle to be gauged. Each arm 24, 26 forms a clasp 242, 246 on a free end thereof.

Figure 5:
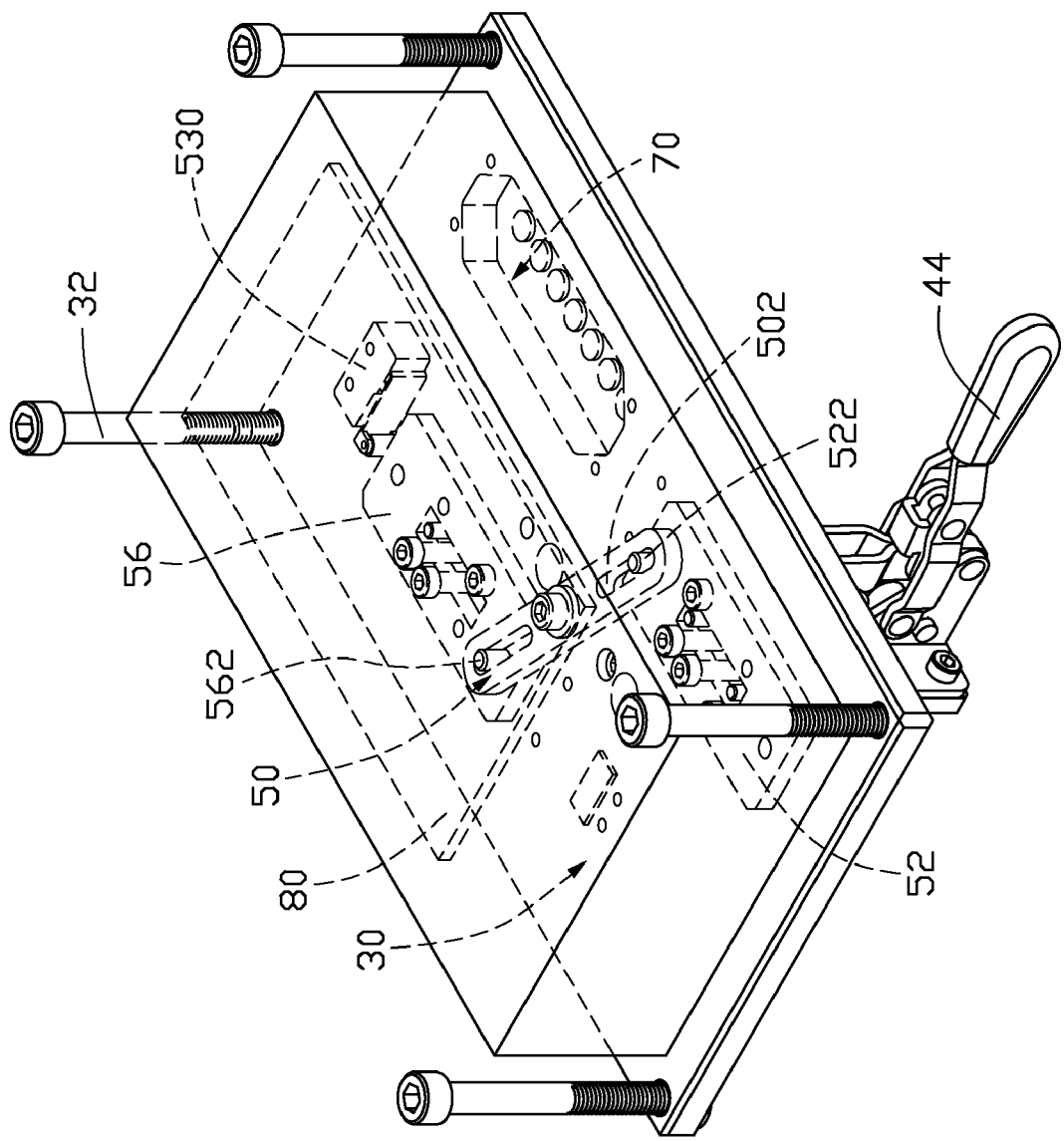
FIG. 5 is an inverted view of FIG. 1.
Figure 6:
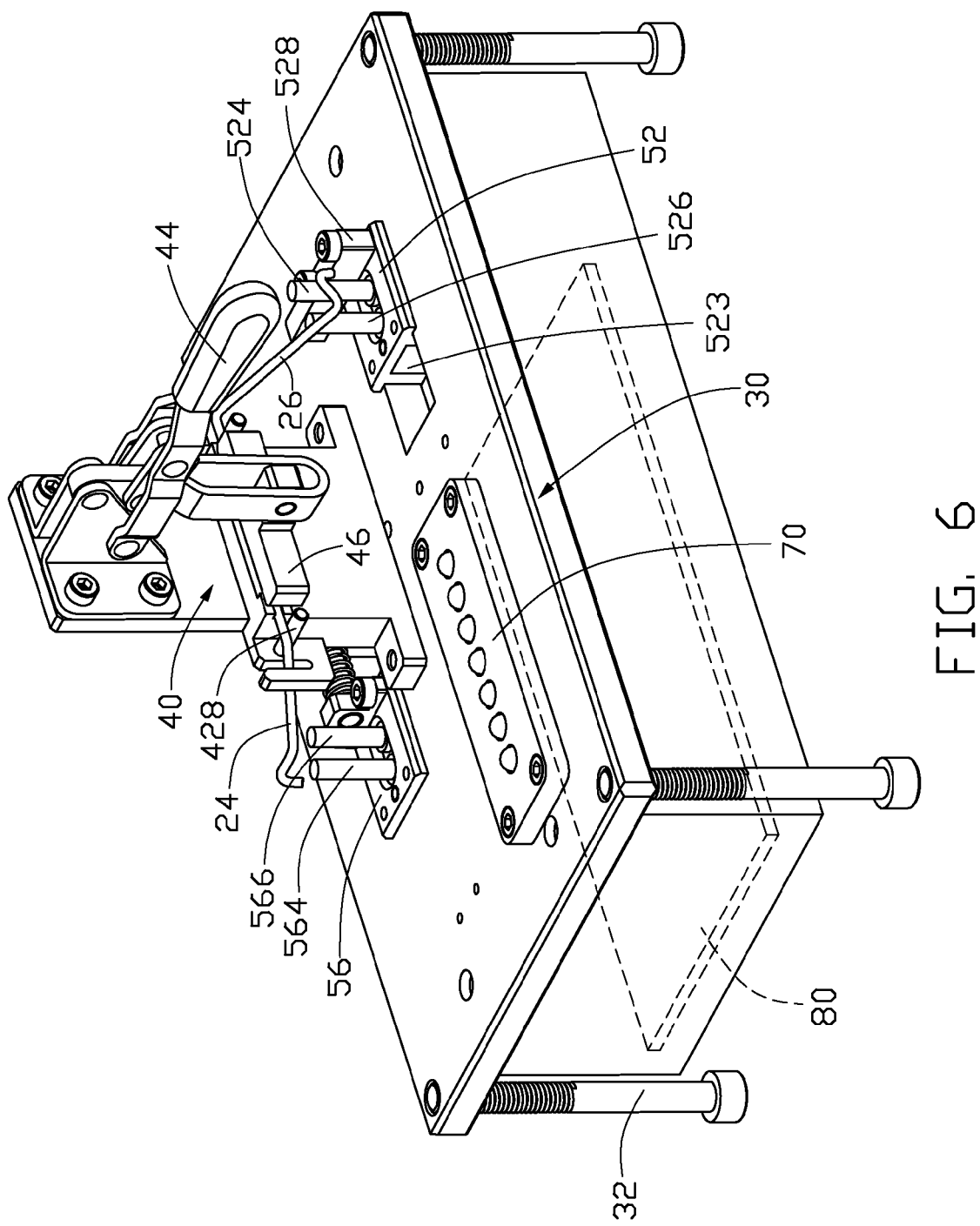
FIG. 6 is an assembled view of FIG. 1.
Figure 8:
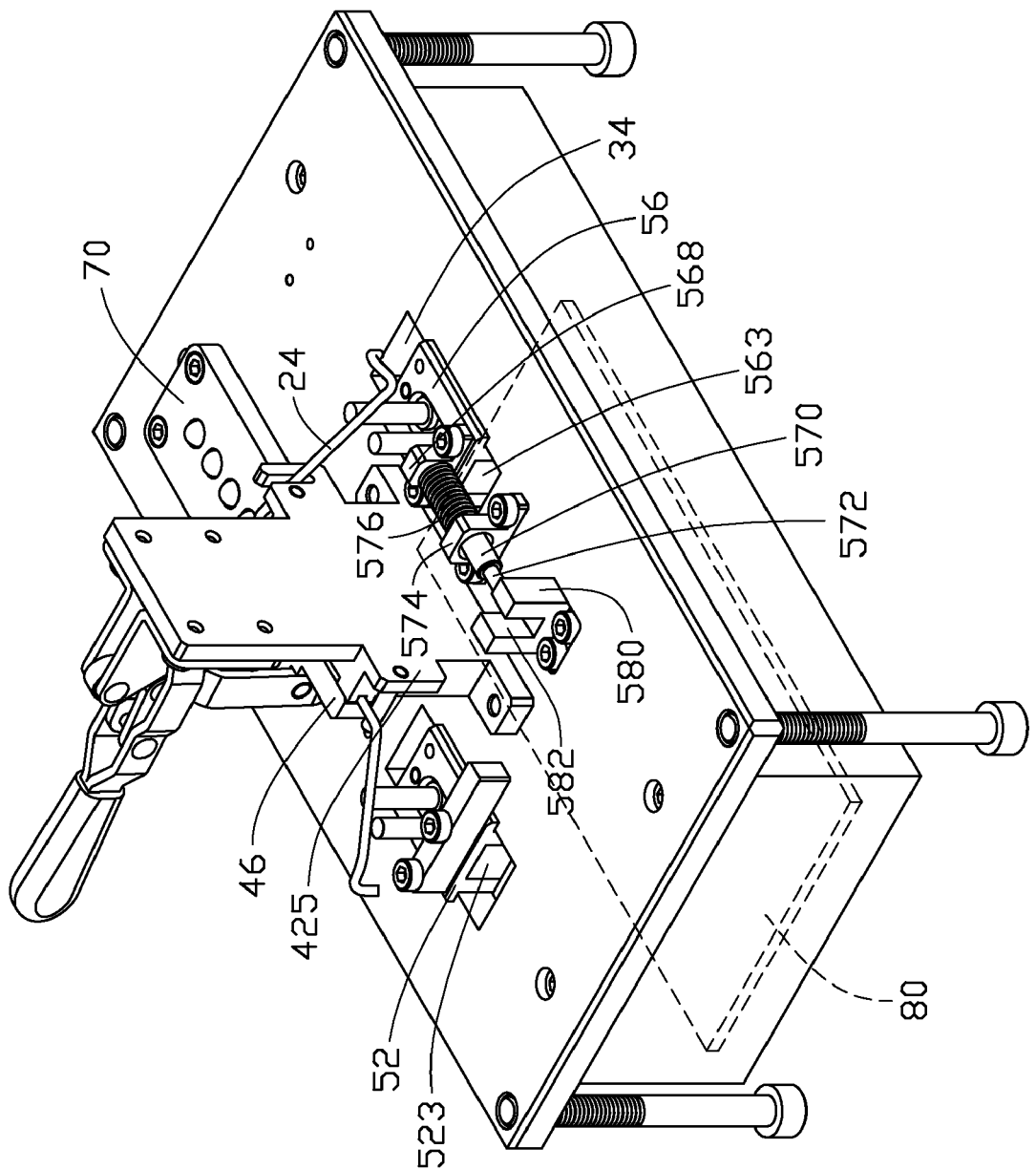
FIG. 8 is similar to FIG. 7, but viewed from another aspect.
Figure 9:
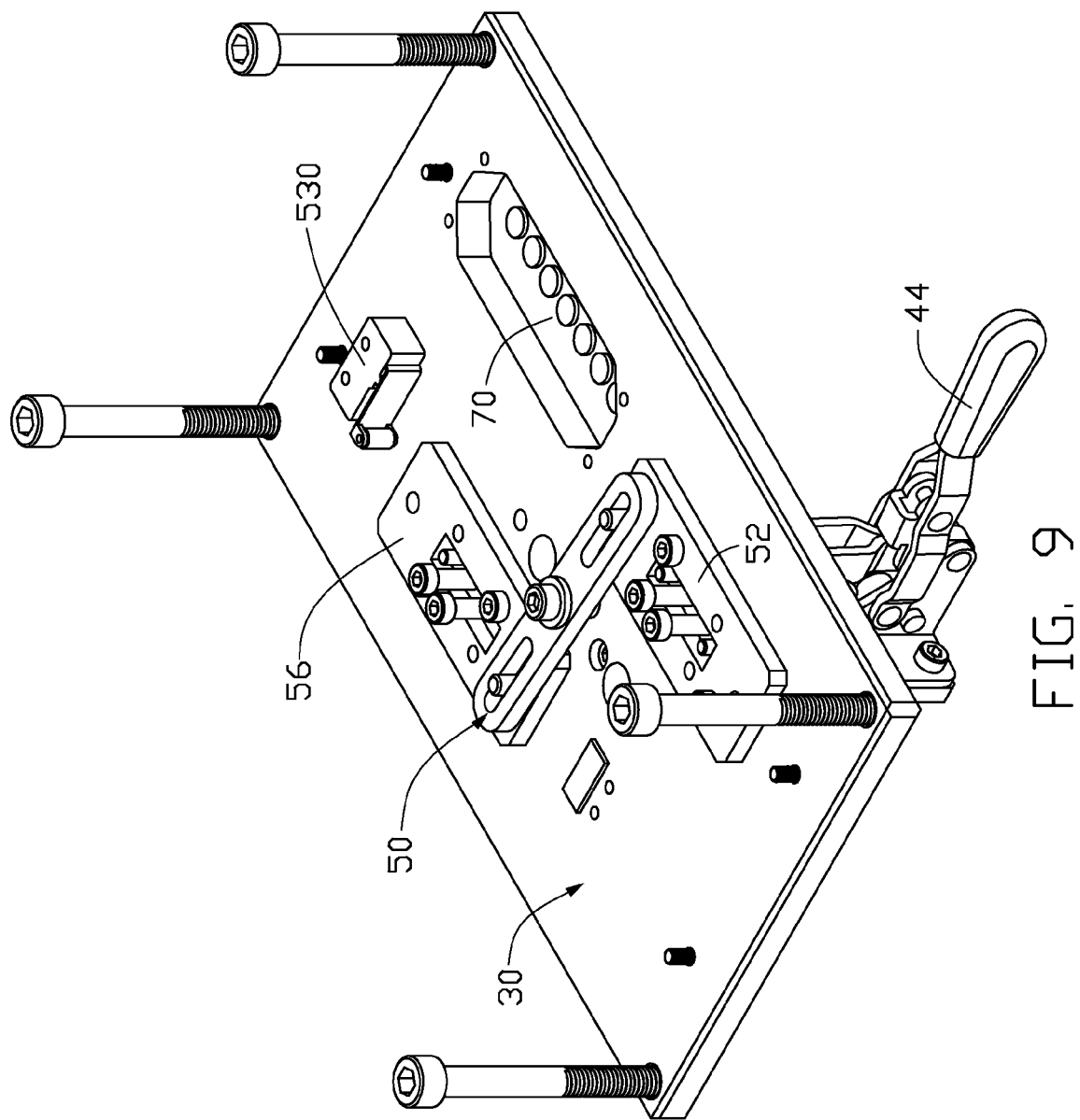
FIG. 9 is an inverted view of FIG. 8, without the control box and the processor.

Referring to FIGS. 1, 5, and 8, the platform 30 is a plate supported by four legs 32. The holding bracket 40, the detecting device, the indicator 70, and the control box 90 are all mounted to the platform 30.

The holding bracket 40 is mounted to the middle portion of a top surface of the platform 30. The holding bracket 40 includes a vertical wall on the lower portion thereof. Two pairs of holding blocks 420 are formed on the vertical wall. Each pair of holding blocks 420 defines a holding slot 422 therebetween, for receiving the shaft 22 of the workpiece 20. Two holding tabs 424, 425 are respectively formed on two sidewalls of the holding bracket 40. Each holding tab 424, 425 forms a supporting post 428, for supporting the workpiece 20. The holding tab 424 defines a vertical groove 426 therein. A handle 44 and a cantilever 48 are connected to an upper portion of the holding bracket 40 by pivots. The cantilever 48 includes a retaining block 46 on a free end thereof. A bottom wall of the retaining block 46 is a plane. The handle 44 is pivotably connected with the cantilever 48. When the handle 44 is operated up or down, the cantilever 48 is driven to move the retaining block 46 towards or away from the vertical wall of the holding bracket 40. The holding bracket 40 is grounded. When the workpiece 20 is held by the holding bracket 40, the workpiece 20 is grounded.

Figure 7:
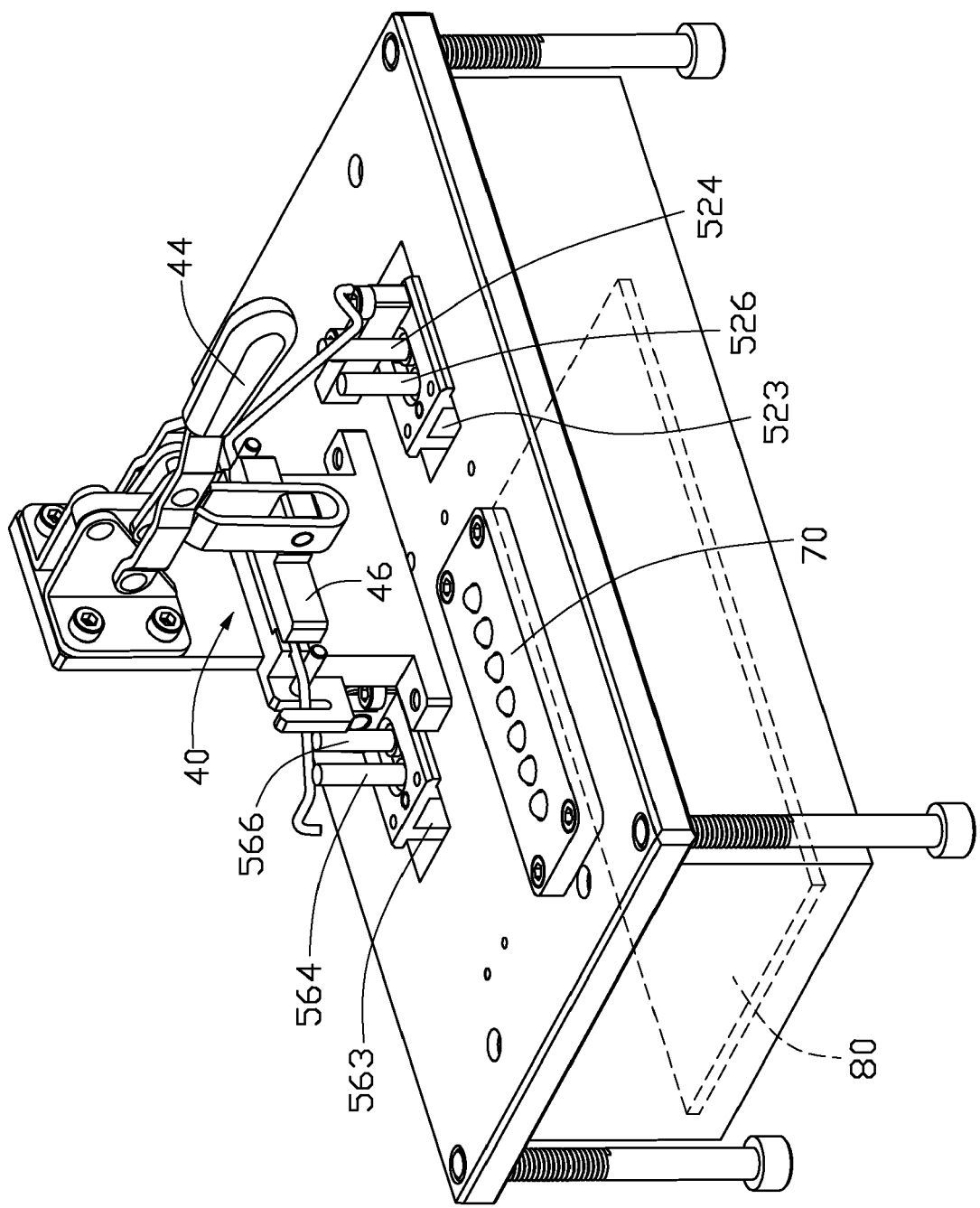
FIG. 7 is similar to FIG. 6, showing an angle in the workpiece being gauged by the detecting apparatus.
Figure 10:
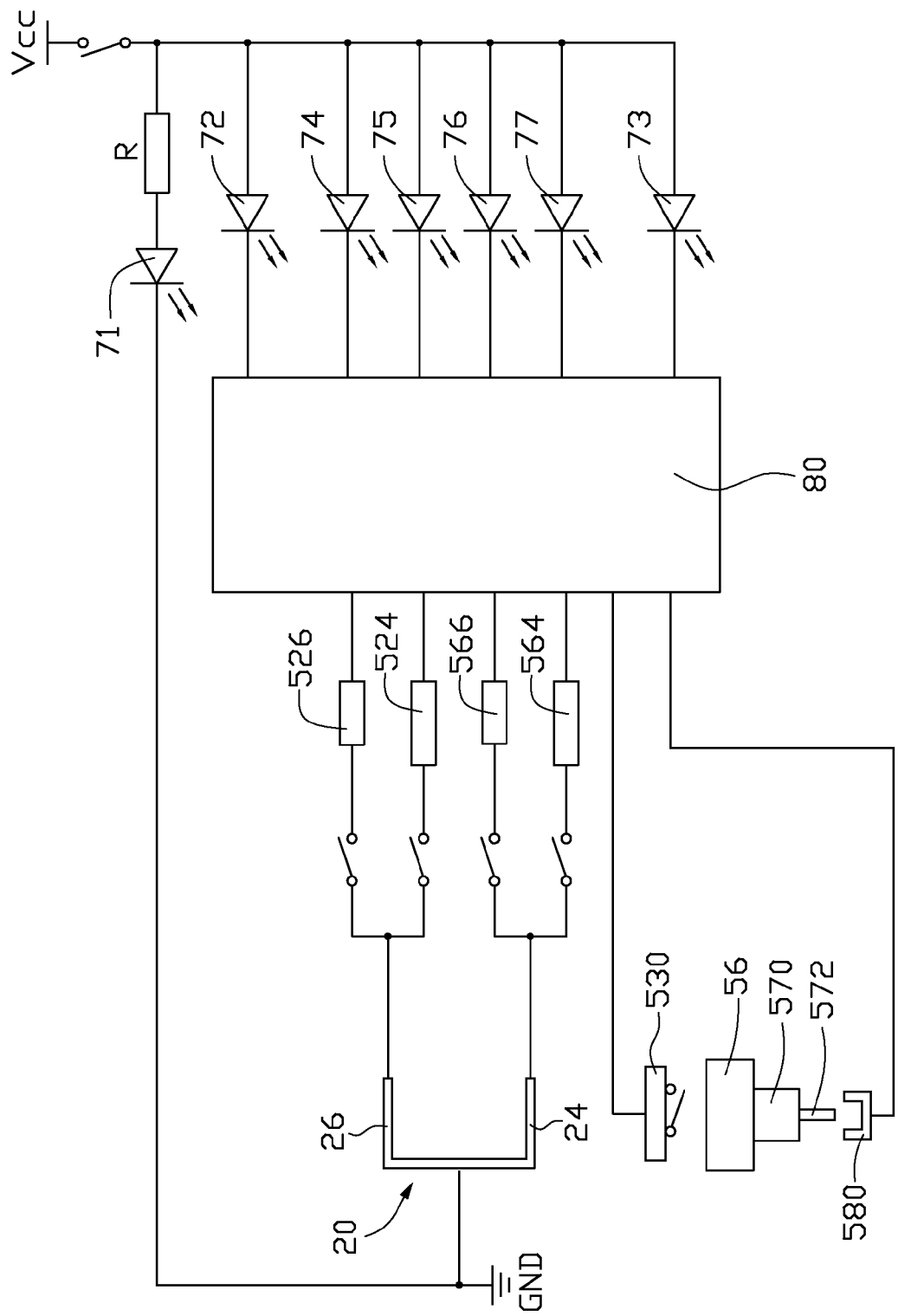
FIG. 10 shows an electrical relationship between the workpiece, and some parts of the detecting apparatus in accordance with the embodiment of the present invention.

Referring particularly to FIGS. 1 and 5, the detecting device includes two detecting portions 52, 56, and an interlock bar 50 connected between the detecting portions 52, 56. A middle portion of the interlock bar 50 is pivotably mounted to the bottom surface of the platform 30. The interlock bar 50 defines a sliding slot 502 at each end thereof. The detecting portions 52, 56 respectively extend through two slots 34 defined in the platform 30, thereby being horizontally slidably mounted on the platform 30, adjacent the holding bracket 40. Each detecting portion 52, 56 forms an interlock post 522, 562 on a bottom surface thereof. The posts 522, 562 are slidably received in the sliding slots 502 of the interlock bar 50, respectively. Each detecting portion 52, 56 includes an insulating block 523, 563 (see FIG. 7). Each insulating block 523, 563 includes a long pin 524, 564 and a short pin 526, 566 extending therethrough. The short pins 526, 566 are nearer to the holding bracket 40 than the long pins 524, 564. The distal ends of the long pins 524, 564 are further from the platfrom 30 than the distal ends of the short pins 526, 566. The height of the short pins 526, 566 relative to the platform 30 is predetermined corresponding to a minimum limit angle A (see FIG. 4) in the eligible range. The height of the long pins 526, 566 relative to the platform 30 is predetermined corresponding to a maximum limit angle A in the eligible range. The pins 524, 564, 526, 566 are electrical conductors. Each pin 524, 564, 526, 566 is electrically wired to the processor 80 of the control box 90 (see FIG. 10). The pins 524, 564, 526, 566 are all normally at high potential, and insulated from the platform 30 and the holding bracket 40 by the corresponding insulating blocks 523, 563. The detecting portion 52 forms an operating portion 528 on an end thereof, adjacent the long pin 524. The operating portion 528 can be pushed to drive the detecting portion 52 to slide along the slot 34. The detecting portion 56 can be driven to slide by the interlock bar 50 when the detecting portion 52 is driven. A touching switch 530 is mounted on the bottom surface of the platform 30. The touching switch 530 is wired to the processor 80. The detecting portion 56 touches with the touching switch 530 when it is in an initial position and the workpiece 20 is received in the holding bracket 40. When the detecting portion 56 is slid away from its initial position, it will not touch the touching switch 530 any more. Therefore the touching switch 530 turns on and activates the processor 80. Referring particularly to FIG. 8, the detecting portion 56 forms a projection 568 on an end thereof, adjacent the short pin 566. A pole 570 parallel to the top surface of the platform 30 extends from the projection 568. A trigger pin 572 is formed on a free end of the pole 570. An abutting block 574 is formed on the top surface of the platform 30, adjacent the slot 34. The abutting block 574 defines a through hole for the pole 570 to extend through. A spring 576 coils around the pole 570. Two ends of the spring 576 abut against the projection 568 and the abutting block 574, respectively. A photoelectric switch 580 electrically wired to the processor 80 is mounted on the top surface of the platform 30. A slot 582 is defined in the photoelectric switch 580. When the trigger pin 572 of the pole 570 is inserted into the slot 582, the photoelectric switch 580 responds and sends a detecting-over signal to the processor 80.

The indicator 70 is fixed on a corner of the platform 30, for indicating detecting results. The indicator 70 is electrically wired to the processor 80 of the control box 90, for receiving the detecting results from the processor 80. The indicator 70 includes seven lights 71, 72, 73, 74, 75, 76, 77. The light 71 is a power indicator light. When the detecting apparatus is switched on, the light 71 turns on. The light 73 is a detecting-over indicator light. The turning on of the light 73 indicates the detecting process of the workpiece 20 is over. When the trigger pin 572 of the pole 570 is inserted into the slot 582, the light 73 turns on. An on/off pattern of the lights 72, 74, 75, 76, 77 indicate whether the workpiece 20 is eligible.

Referring to FIGS. 6 to 10, in detecting, the detecting apparatus is switched on, and the light 71 turns on. The shaft 22 of the workpiece 20 is received in the holding slots 422, and held by the holding blocks 420 and supporting posts 428 of the holding bracket 40. The handle 44 is turned to drive the retaining block 46 toward the vertical wall of holding bracket 40. The shaft 22 of the workpiece 20 is then held between the retaining block 46 and the vertical wall. The offset section 222 contacts with the vertical wall of the holding bracket 40 to prevent the workpiece 20 from pivoting around an axis of the shaft 22. The arm 24 extends through the groove 426 of the holding bracket 40 to prevent the workpiece 20 from sliding along the axis of the shaft 22. At this time, the workpiece 20 is grounded through the holding bracket 40.

The operating portion 528 of the detecting portion 52 is pushed to drive the detecting portion 52 to slide along the slot 34 of the platform 30, toward the indicator 70. At the same time, the detecting portion 56 is driven to slide away from the touching switch 530 toward the photoelectric switch 580 by the interlock bar 50. When the detecting portion 56 disengages from the touching switch 530, the touching switch 530 turns on and sends a detecting-start signal to tell the processor 80 of the control box 90 that a detecting process of the workpiece 20 starts. The processor 80 records any change in potential of the pins 524, 564, 526, 566 to correspondingly control the lights 72, 74, 75, 76, 77 to turn on or off.

The situation is that if any pins 526, 524, 566, 564 contact the workpiece 20, its high potential will turn low because the workpiece 20 is grounded through the holding bracket 40, and if else, its high potential will keep on. The workpiece 20 is made of elastic material and can be deformed without being destroyed. Therefore the pins 526, 566, 524, 564 can slide through under the arms 24, 26 even if one or more pin 526, 566, 524, 564 contacts the corresponding arm 24, 26.

In the sliding movement of the detecting portions 52, 56, the pins 526, 524, 566, 564 approach the corresponding arms 26, 24 of the workpiece 20. If the angle A of the arm 24 of the workpiece 20 is too small, the short pin 566 will contact the arm 24 of the workpiece 20. Therefore the potential of the short pin 566 goes low, and the processor 80 controls the light 76 to turn on and the light 72 to remain off for indicating that the angle A of the arm 24 is too small and the workpiece is ineligible.

If the angle A of the arm 26 of the workpiece 20 is too small, the short pin 526 will contact the arm 26 of the workpiece 20. Therefore the potential of the short pin 526 goes low, and the processor 80 controls the light 74 to turn on and the light 72 to remain off for indicating that the angle A of the arm 26 is too small and the workpiece 20 is ineligible.

If both of the angles A of the arms 26 and 24 of the workpiece 20 are too small, the lights 76 and 74 turn on at the same time.

If the arms 26, 24 of the workpiece 20 are eligible, the short pins 526, 566 will slide through under the corresponding arms 26, 24 with no contact, then the long pins 524, 526 will contact the arms 26, 24, respectively. The potential of the short pins 526, 566 keep high and the potential of the long pins 524, 526 go to low, and the processor 80 controls the light 72 to turn on for indicating the workpiece 20 is eligible.

If the angle A of the arm 24 of the workpiece 20 is too large and the angle A of the arm 26 is in the eligible range, firstly the short pin 566 slides through under the arm 24 with no contact and the short pin 526 slides through under the arm 26 with no contact, and then the long pin 564 slides through under the arm 24 with no contact wheile the long pin 524 contacts the arm 26. Therefore the potential of the short pins 566, 526 and the long pin 564 keep high and the long pin 524 goes low, according to which, the processor 80 controls the light 77 to turn on and the light 72 to remain off for indicating that the angle A of the arm 24 is too large and the workpiece is ineligible, and controls the light 75 to remain off.

If the angle A of the arm 24 of the workpiece 20 is too large and the angle A of the arm 26 is too small, firstly the short pin 566 will slide through under the arm 24 with no contact when the short pin 526 will contact the arm 26, and then the long pin 564 will slide through under the arm 24 with no contact when the long pin 524 will contact the arm 26. Therefore the potential of the short pin 566 and the long pin 564 keep high and the short pin 526 and the long pin 524 go low, according to which, the processor 80 controls the light 77 to turn on and the light 72 to remain off for indicating that the angle A of the arm 24 is too large and the workpiece is ineligible, and controls the light 74 to turn on for indicating the angle A of the arm 26 is too small.

If the angle A of the arm 26 of the workpiece 20 is too large and the angle A of the arm 24 is in the eligible range, firstly the short pin 526 will slide through under the arm 26 with no contact when the short pin 566 will slide through under the arm 24 with no contact, and then the long pin 524 will slide through under the arm 26 with no contact when the long pin 564 will contact the arm 24. Therefore the potential of the short pins 526, 566 and the long pin 524 keep high, and the long pin 564 goes low, according to which, the processor 80 controls the light 75 to turn on for indicating that the angle A of the arm 26 is too large and the workpiece is ineligible, and controls the light 76 to remain off.

If the angle A of the arm 26 of the workpiece 20 is too large and the angle A of the arm 24 is too small, firstly the short pin 526 will slide through under the arm 26 with no contact when the short pin 566 will contact the arm 24, and then the long pin 524 will slide through under the arm 26 with no contact when the long pin 526 will contact the arm 24. Therefore the potential of the short pin 526 and the long pin 524 keep high, and the short pin 566 and the long pin 564 go low, according to which, the processor 80 controls the light 75 to turn on and the light 72 to remain off for indicating that the angle A of the arm 24 is too large and the workpiece is ineligible, and controls the light 76 to turn on for indicating that the angle A of the arm 24 is too small.

Figure 11:
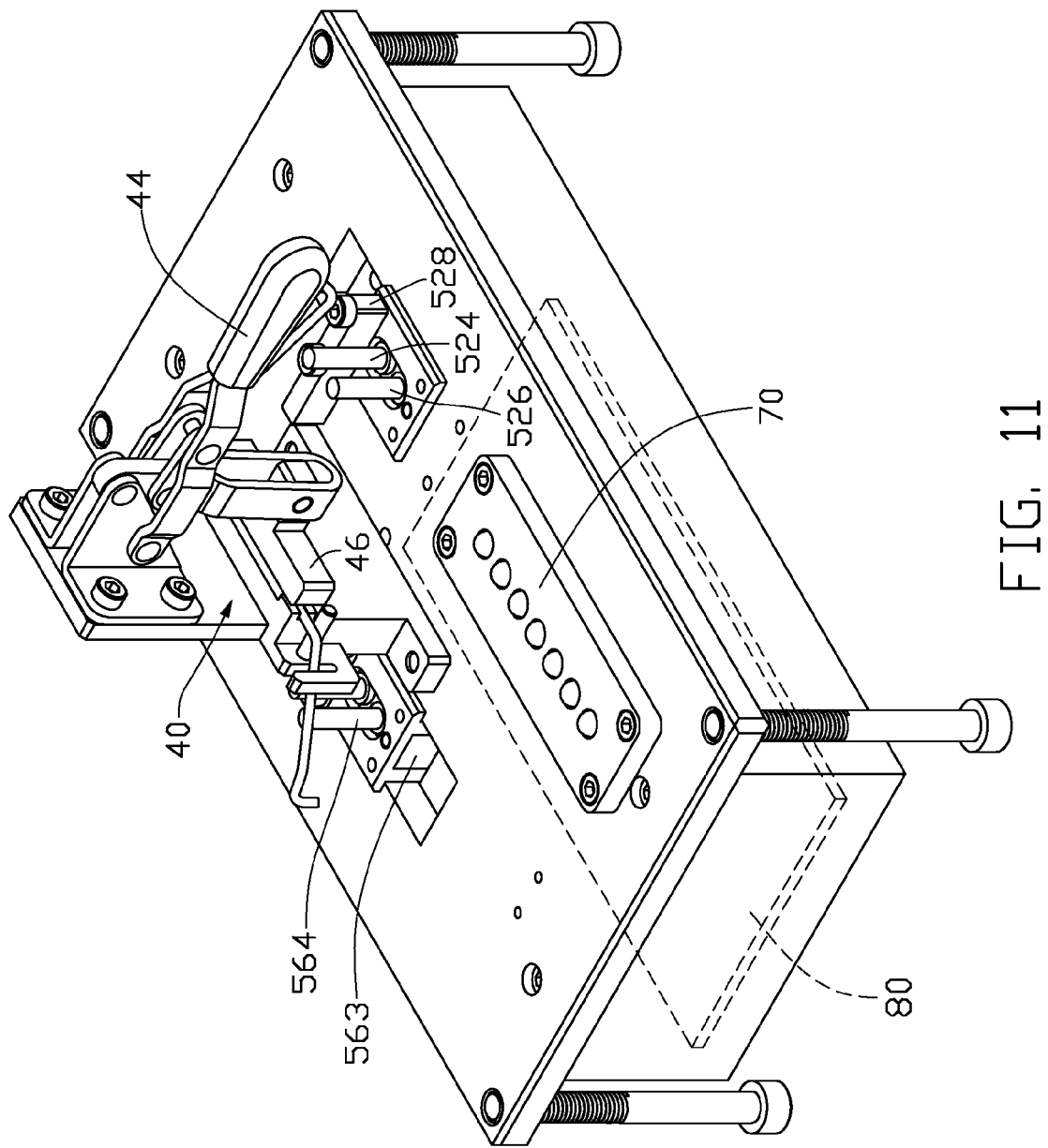
FIG. 11 is an isometric view showing the workpiece having an ineligible bend angle being gauged by the detecting apparatus.
Figure 12:
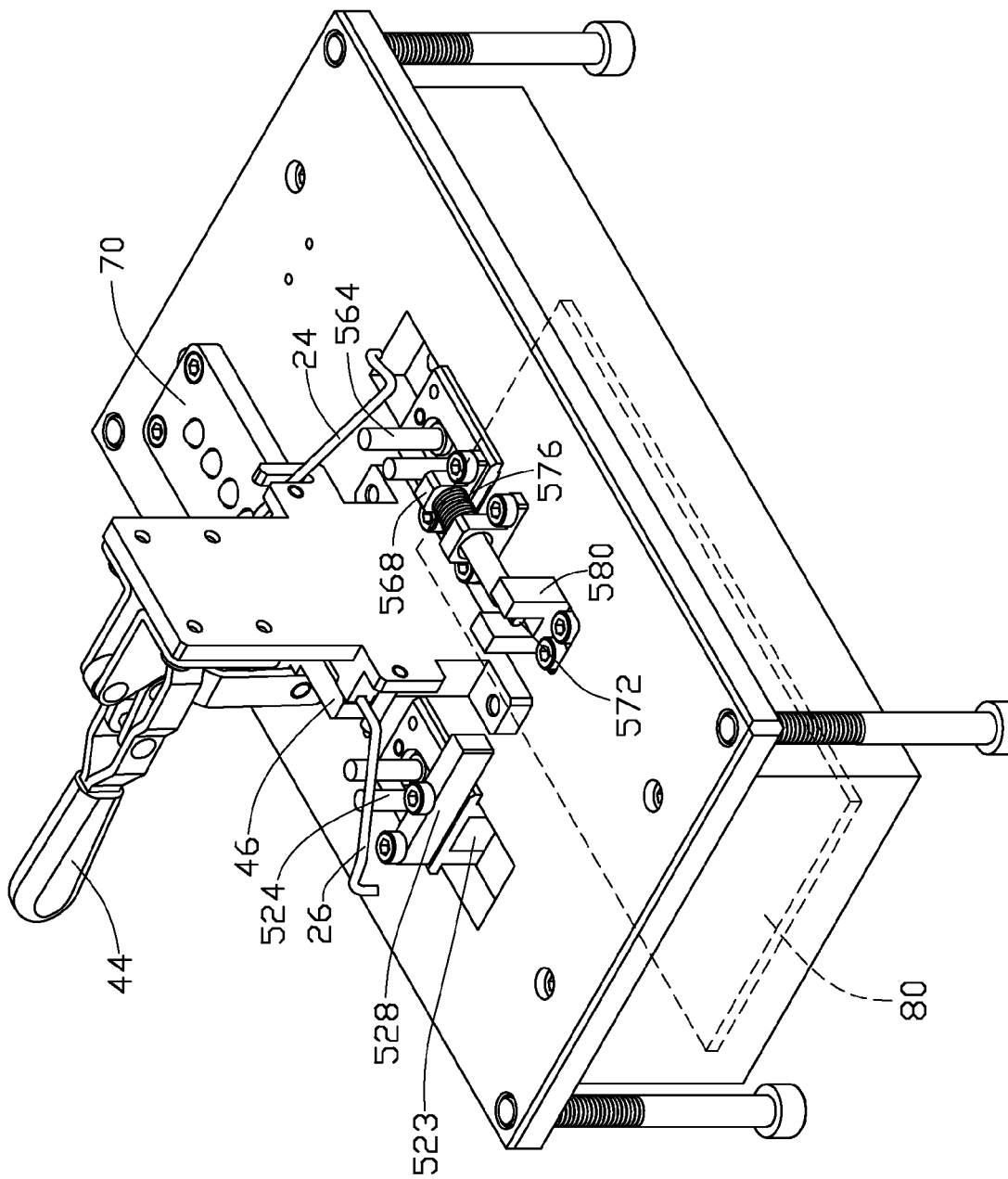
FIG. 12 is similar to FIG. 11, but viewed from another aspect.
Figure 13:
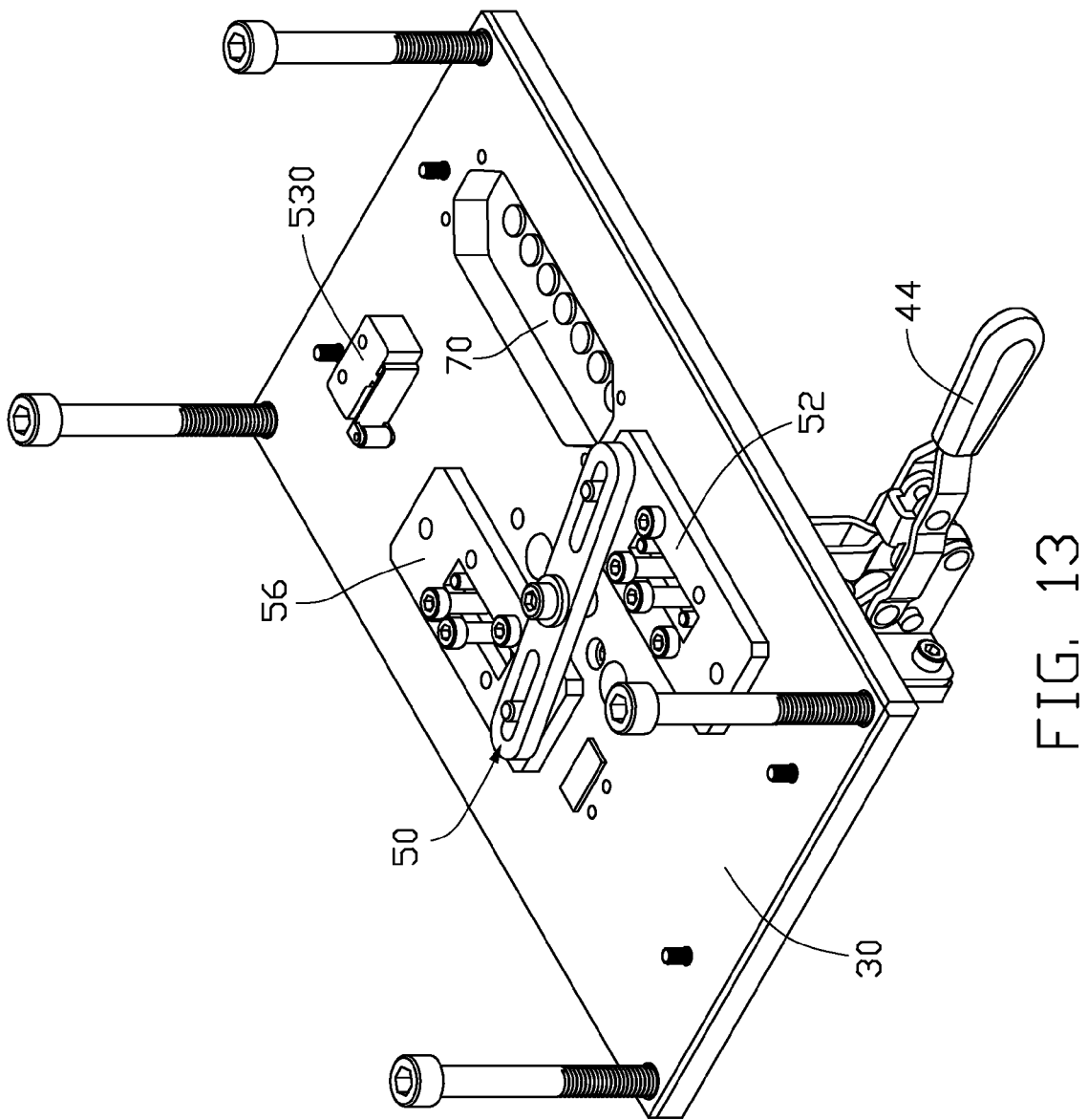
FIG. 13 is an inverted view of FIG. 12, without the control box and the processor.

Referring to FIGS. 11 to 13, if both of the angles A of the arms 26 and 24 of the workpiece 20 are too large, the long pins 524, 564 will both slide through under the corresponding arms 26, 24 with no contact. The detecting portions 52, 56 continue sliding along the slots 34 of the platform 30, until the trigger pin 572 of the pole 570 is inserted into the slot 582 of the photoelectric switch 580. The photoelectric switch 580 is on, which activates the processor 80 to control the light 73 to turn on. At the same time, the potential of the short pins 526, 566 and the long pins 564, 524 still keep high. The processor 80 receives signals that the photoelectric switch 580 is on and all the pins 526, 566, 564, 524 are in high potential, and controls the lights 75, 77 to turn on for indicating both angles A of the arms 24, 26 are too large and the workpiece 20 is ineligible.

The operator can push the detecting portions 52, 56 sliding along the slots 34 until the light 73 turns on, then record the results indicated by the indicator 70. Of course, the operator can finish the detecting of the workpiece 20 when one or more lights 74, 76 turn on.

In sliding the detecting portion 56, the spring 576 is deformed between the abutting block 574 and the projection 568. When the detecting is finished, the detecting portion 56 is slid backward by the rebound force of the spring 576. The detecting portion 52 is driven to slide backward by the interlock bar 50. The detecting portion 56 contacts and deactivates the touching switch 530, which activates the processor 80 of the control box 90 to wait for a next detecting process for another workpiece 20.

The meanings of on and/or off patterns of the lights 71, 72, 73, 74, 75, 76, 77 above are shown in the table below. Note that "NC" means not care.

| Light pattern | | | | | | | |
|---|---|---|---|---|---|---|---|
| 71 | 72 | 73 | 74 | 75 | 76 | 77 | meaning |
| on | NC | NC | NC | NC | NC | NC | detecting device power on |
| on | on | NC | off | off | off | off | workpiece 20 eligible |
| on | NC | on | NC | NC | NC | NC | photoelectric switch 580 on, detecting process over |
| on | off | NC | on | off | NC | NC | angle A of arm 26 too small, workpiece 20 ineligible |
| on | off | NC | NC | NC | on | off | angle A of arm 24 too small, workpiece 20 ineligible |
| on | off | on | off | on | NC | NC | angle A of arm 26 too large, workpiece 20 ineligible |
| on | off | on | NC | NC | off | on | angle A of arm 24 too large, workpiece 20 ineligible |

In other embodiments, the lights of indicator 70 can be replaced with other devices, such as a display, or a sound alert device.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A detecting apparatus for detecting an angle of a bend in an electrically conductive workpiece, the detecting apparatus comprising:
   a platform;
   a holding bracket mounted on the platform and being grounded, configured for holding and electrically connecting with the workpiece;
   at least one detecting portion slidably mounted to the platform, and comprising a short pin and a long pin, wherein the pins are normally at high potential and go low potential if contacting the workpiece when the at least one detecting portion is slid;
   a processor, the pins of the at least one detecting portion electrically connected to the processor, the processor judging an eligibility of the angle of the bend in the workpiece according to the potential pattern of each of the pins; and
   an indicator electrically connected to the processor, configured to show a detecting result done by the processor.

2. The detecting apparatus as described in claim 1, wherein the at least one detecting portion comprises two detecting portions connecting together by an interlock bar.

3. The detecting apparatus as described in claim 2, wherein a touching switch contactable with one of the detecting portions is mounted on the platform and wired to the processor, when the one of the detecting portions slides along the platform, the touching switch disengages from the one of the detecting portions and turns on and sends a detecting-start signal to the processor.

4. The detecting apparatus as described in claim 2, wherein a photoelectric switch defining a slot is mounted on the platform and wired to the processor, one of the detecting portions forms a trigger pin, and when the trigger pin is inserted into the slot, the photoelectric switch sends a detecting-over signal to the processor, the processor controls the indicator to indicate the detecting process has finished.

5. The detecting apparatus as described in claim 4, wherein the detecting portion forming the trigger pin further comprises a projection, a pole coiled around by a spring extends from the projection, the trigger pin is formed on a free end of the pole, an abutting block is installed on the platform, two ends of the spring respectively abut against the projection and the abutting block, the abutting block defines a through hole allowing extension of the trigger pin.

6. The detecting apparatus as described in claim 1, wherein the holding bracket forms two pairs of holding blocks, each pair of holding blocks defines a holding slot therebetween configured for receiving the workpiece.

7. The detecting apparatus as described in claim 6, wherein a handle and a cantilever are connected to an upper portion of the holding bracket by pivots, the cantilever comprises a retaining block on a free end thereof, a bottom wall of the retaining block is a plane configured for holding the workpiece to the holding bracket.

8. The detecting apparatus as described in claim 1, wherein the indicator comprises a plurality of lights configured for indicating detecting results.

9. The detecting apparatus as described in claim 1, wherein the pins of the at least one detecting portion are insulated from the platform and the holding bracket by an insulating block.

10. The detecting apparatus as described in claim 1, further comprising a control box attached below the platform for receiving the processor.

11. A detecting apparatus for detecting an angle formed between a shaft and an arm of an electrically conductive workpiece, the detecting apparatus comprising:
   a platform;
   a holding bracket mounted on the platform and being grounded, configured for holding and electrically connecting with the shaft of the workpiece;
   a detecting portion mounted on the platform adjacent to the holding bracket, comprising a first pin and a second pin, wherein the pins are normally at high potential and go low potential if contacting the arm of the workpiece, the detecting portion being slidable along the platform such that the first pin is capable of contacting the arm of the workpiece if the angle of the workpiece is smaller than a minimum value of a predetermined range and the second pin is capable of contacting the arm of the workpiece if the angle of the workpiece is less than a maximum value of the predetermined range;
   a processor electrically connected to the pins of the detecting portion configured to judge the eligibility of the angle of the workpiece according to the potential pattern of each of the pins; and
   an indicator electrically connected to the processor, configured to indicate a detecting result achieved by the processor.

12. The detecting apparatus as described in claim 11, wherein each of the pins has a distal end away from the platform, and the distal end of the first pin is further from the platform than the distal end of the second pin.

13. The detecting apparatus as described in claim 11, wherein the indicator comprises two indicating lights corresponding to the pins of the detecting portion, when a short pin contacts the arm of the workpiece one of the indicating lights corresponding to the short pin turns on to indicate that the angle of the workpiece is less than the minimum value of the predetermined range, when a long pin contacts the arm of the workpiece the two indicating lights remains off to indicate that the angle of the workpiece is within the predetermined range.

14. The detecting apparatus as described in claim 11, further comprising another detecting portion connected to the detecting portion by an interlock bar, wherein the another detecting portion is movable with the detecting portion and comprises a short pin and a long pin arranged perpendicular to the platfrom configured to detect another angle formed between the shaft and another arm of the workpiece.

15. The detecting apparatus as described in claim 14, wherein a touching switch contactable with one of the detecting portions is mounted on the platform and wired to the processor, when the one of the detecting portions slides along the platform to disengage from the touching switch, the touching switch sends a detecting-start signal to the processor.

16. The detecting apparatus as described in claim 14, wherein a photoelectric switch defining a slot is mounted on the platform and wired to the processor, one of the detecting portions forms a trigger pin, when the trigger pin is inserted into the slot, the photoelectric switch sends a detecting-over signal to the processor, the processor controls the indicator to indicate the detecting process has finished.

* * * * *